United States Patent [19]

Deutsch

[11] 4,208,712

[45] Jun. 17, 1980

[54] MULTI-UNIT OPTIMIZATION

[75] Inventor: Murray L. Deutsch, Princeton, N.J.

[73] Assignee: Mobil Oil Corporation, New York, N.Y.

[21] Appl. No.: 86,296

[22] Filed: Nov. 2, 1970

Related U.S. Application Data

[63] Continuation of Ser. No. 417,248, Dec. 9, 1964, abandoned.

[51] Int. Cl.² .................. G06G 7/58; G06F 15/46; G05B 15/00
[52] U.S. Cl. ........................... 364/105; 364/108; 364/118; 364/500
[58] Field of Search ............... 235/150.1, 151, 151.1, 235/151.12; 364/105, 118, 106, 108, 496, 500, 501, 502, 121, 464

[56] References Cited

U.S. PATENT DOCUMENTS

| | | | |
|---|---|---|---|
| 3,002,818 | 10/1961 | Berger | 235/151.12 |
| 3,044,701 | 7/1962 | Kerstukos et al. | 235/150.1 |
| 3,048,331 | 8/1962 | Van Nice et al. | 235/150.1 |
| 3,079,079 | 2/1963 | Phister et al. | 235/150.1 |
| 3,175,968 | 3/1965 | Berger | 235/151.12 |

*Primary Examiner*—Joseph F. Ruggiero
*Attorney, Agent, or Firm*—Charles A. Huggett; Michael G. Gilman

[57] ABSTRACT

Optimization of the operation of a process unit in a multiunit multiplant processing system is controlled through a closed optimizing control loop on said process unit while periodically closing a second control loop on the plant in which said process unit is located periodically to establish an optimum plant operating point and thereby to set an operating point for said process unit dependent upon the optimum for operation of the plant. Periodically, but at intervals less frequent than the closing of the control loop on the plant, a control loop is closed on the system to establish an optimum operating point for the system and to reset the operating point for the plant and for the process unit dependent upon optimum operation of the system.

12 Claims, 1 Drawing Figure

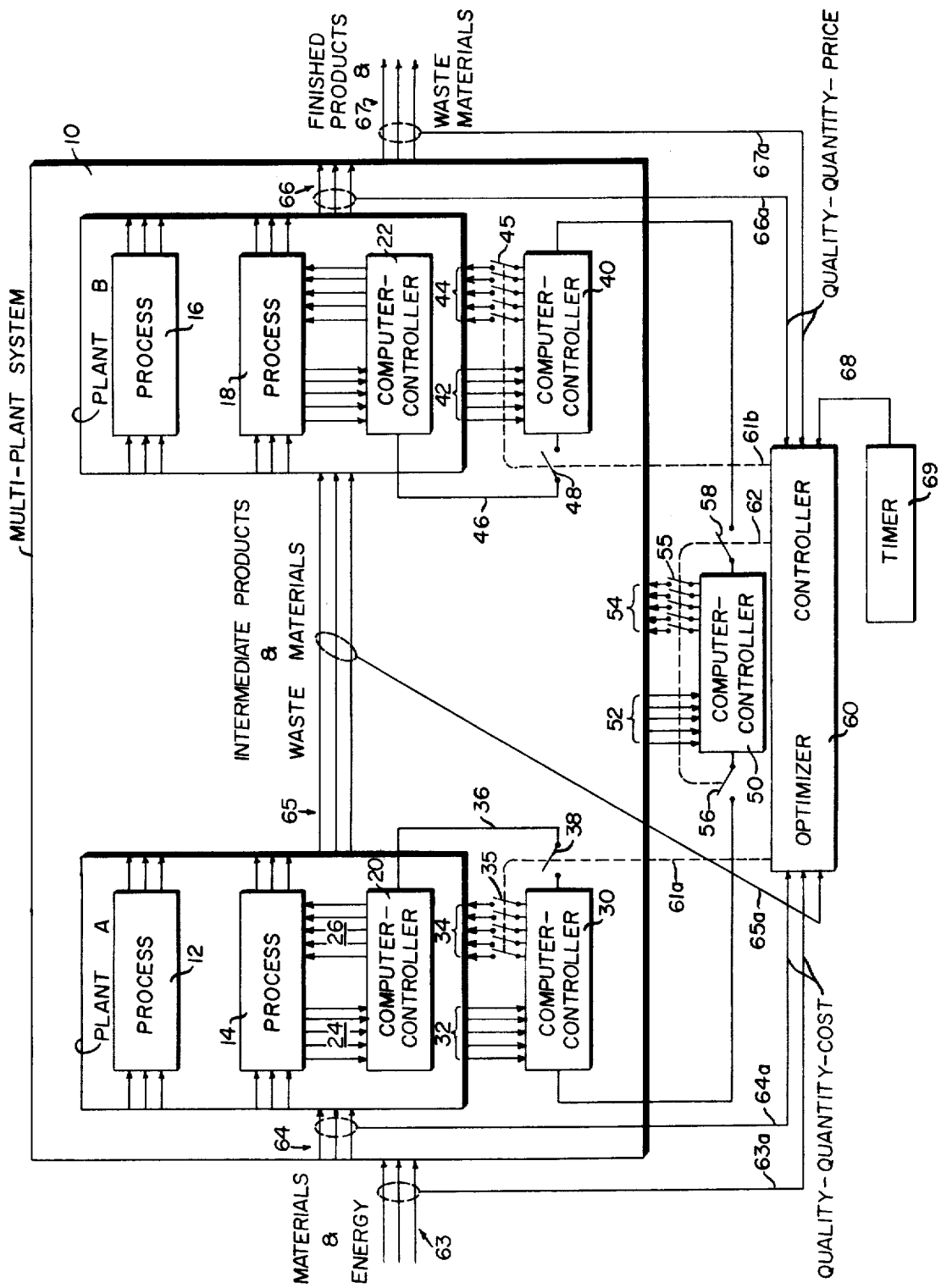

MULTI-UNIT OPTIMIZATION

This is a continuation of application Ser. No. 417,248, filed Dec. 9, 1964, now abandoned.

This invention relates to the operation of a multi-unit, multi-plant processing system and more particularly to the optimization of such systems for achieving a balance between the quantity and quality of products from process units in several plants, in each of which at least one process unit is optimized or controlled for operation at an optimum level substantially continuously in dependence upon material and production costs, market prices and variable process control functions.

In a more specific aspect, the invention relates to a continuous optimization of a process unit together with frequent modification of process units in a plant for optimization of the plant, upon which there is superimposed less frequent modification of operation of the system to an optimum level.

In integrated systems wherein a plurality of multi-unit plants are operated at geographically spaced points for utilization of raw materials and for delivery of finished products to distributed markets, supervisory control at various levels with graded rigidity has been found to be desirable. Operation preferably is at optimum levels dictated by the system performance and demands.

From an over-all viewpoint, operation of a given process unit has direct bearing upon operation of companion units scattered throughout the system. Similarly, the operating point for operation of a multi-unit plant has a bearing upon operation of companion plants in the system.

In accordance with the present invention, operation of a given process unit in a plant is optimized substantially continuously. Responsive to changes in intermediate control signals for each plant beyond the limits of preset plant constraints, dependent upon any one of quality or quantity of input materials, time, costs, and prices, the operating point for the plant is altered. Similarly, in response to changes in secondary control signals for the multi-plant system beyond the limits of preset system constraints, dependent upon any one of quality or quantity of input materials, time, costs, or prices, the operating point for the system is altered.

For a more complete understanding of the present invention and for further objects and advantages thereof, reference may now be had to the following description taken in conjunction with the accompanying drawing in which:

The FIGURE illustrates a generalized two-plant system with staged optimizing control.

While the present invention is applicable to operation of multiple plants in an integrated system, it will first be described in connection with the system comprised of two multi-unit plants illustrated in FIG. 1.

TWO-PLANT CASE

In the FIGURE, a system 10 includes plant A and plant B, each of which includes a plurality of process units. Plant A includes units 12 and 14. Plant B includes units 16 and 18. For the purpose of the present description, it will be assumed that at least one of the process units in each of the plants is operated at an optimum level, as under control of a computer-controller 20. The computer 20 controls process unit 14 and the computer 22 controls the process unit 18.

The computers 20 and 22 are preferably operated such that the quality, quantity, and cost of input materials and energy are monitored and the process variables in the unit 14 are controlled so that in producing intermediate products, the process unit 14 will be optimized, based upon a given criterion for process unit 14. The optimum may be, for example, a maximum quantity per unit time of a product of specified quality. The optimizer may be of the type described in U.S. Pat. No. 3,079,079 to Phister et al., where the system there disclosed provides for optimum operation based upon maximum profit for a given process unit. Units 12, 14, 16 and 18 of FIG. 1 may be of the type shown in FIG. 2 of said Patent 3,079,079.

In the FIGURE, the material and energy flow to the process unit 14 and the process variables effective therein may be controlled in the manner taught by the Phister et al. patent. Other optimizing systems and techniques are known in the art and may be employed as alternatives to that shown in Phister et al. For example, U.S. Pat. No. 3,044,701 to Kerstukos et al. describes the method of optimization of a given process unit.

It will be noted that information channels 24 lead from the process unit 14 to the computer 20 and control functions are applied by way of channels 26 from the computer to the process unit 14.

In accordance with the present invention, the operating point for plant A is set under the operation of a computer 30. Input data indicating the input and operating parameters of plant A are applied to the computer 30 by way of channels 32. Control functions are applied from the computer 30 to plant A by way of channels 34. Computer 20 is linked to computer 30 by channel 36 which includes a switch 38. Computer 30 is coupled to plant A by switches 35 in channels 34. The switch 38 and switches 35 may be maintained closed for continuous operation of the computer 30 whereby the plant A will operate at an optimum point. In a similar manner, a computer 40 receives data by way of channels 42 from plant B and applies control functions to plant B by way of channels 44 in which switches 45 are located. Computer 22 is coupled to computer 40 by channel 46 which includes switch 48 for actuation of the computer 40.

Further, in accordance with the invention, the system 10 is operated under the control of a computer 50 which receives input data by way of channels 52 and applies control functions to the system by way of channels 54 in which switches 55 are located. Computers 30 and 40 are connected to computer 50 by way of channels which include switches 56 and 58, respectively. Computer 50 is operative to control system 10 when switches 55 in channels 54 are closed. Thus, computer 50 is operative when switches 56, 58, and 55 are closed to adjust the operation of the system 10 to an optimum level.

A master control unit 60 is coupled by a first linkage 61a to switches 35 and 38 and by linkage 61b to switches 45 and 48. The unit 60 is connected by a linkage 62 to switches 56, 58 and 55. The unit 60 is further supplied with system input data by way of channel 63a leading from sensors such as shown in U.S. Pat. No. 3,079,079 on the system input channels 63. Plant A input data are supplied by way of channel 64a leading from sensors on plant A input channels 64. Intermediate product and waste data are supplied by way of channel 65a leading from sensors in interplant transfer channels 65. Plant B output data are supplied by way of channel 66a leading from sensors in output channels 66. System output data are supplied by way of channel 67a leading from sensors in system output channels 67. Time base data are supplied by way of channel 68 which leads from a clock unit 69.

In accordance with a preferred mode of operation, at least one process unit in each plant is continuously optimized. Units 14 and 18 are thus controlled by units 20 and 22, respectively. The operation point for plant A is set intermittently, or at least periodically. More particularly, the unit 60 will serve to close switches 35 and 38 when preset limits on the data supplied on channels 64 and 65 are exceeded, so that the plant A will operate at an optimum level as determined by the preset limits. Similarly, the switches 45 and 48 will be closed by unit 60 for reset of the operating level of plant B when the input and output data from plant B deviate from preset limits.

Superimposed upon and supplementing such monitoring is the control action of the clock 69. Clock 69 will serve to cause computers 30 and 40 to be actuated at frequent intervals.

In response to system input data on channel 63, system output data on channel 67, and operating data on channels 53, the computer 50 will be made operative to optimize system 10 by closure of switches 55, 56, and 58 in response to deviations beyond preset system operating limits. Superimposed upon and supplementing such control, the clock 69, through unit 60, will serve to close switches 55, 56, and 58 periodically, at intervals substantially less frequent than the closure of switches 35, 38, 45, and 48. The clock 69 functions to render computers 30, 40 and 50 effective, and can be based upon seasonal variations or upon cycles which modify the desired operating points of the system.

The process unit, plant, and system criteria for optimization preferably are in accordance with the following considerations. In the two-plant case above described, it will be assumed that a single product P is involved. The product P is supplied by plant A to plant B and is thus an intermediate product available to plant B only from plant A. Plant A acquires raw materials on the open market and processes them to produce product P. Product P is then sold to plant B. In the case of crude oil production, for example, the purchases of raw materials may be negligible and expenditures would be limited largely to processing operations such as drilling and pumping. Plant B acquires product P from plant A. In the case where product P is B's only raw material, B processes it, and sells the final product on the open market.

For both A and B, it is possible to define a production cost function. In the case of plant A, the production of an amount of product P is accomplished at a certain or unique cost, $\phi_A(E)$. It is to be understood that an amount (E) of product P is to be produced by A, and A has alternative methods of producing P. For example, A may substitute one raw material for another, or adjust the levels of the various activities in production. Cost $\phi_A(E)$ is the minimum cost over all possible operating schedules. To each non-negative value of E, there corresponds such a minimum cost, and this defines the production cost function $\phi_A(E)$. $\phi_A(E)$ is assumed to be a continuous monotone non-decreasing function defined on the non-negative numbers. The number $\phi_A(0)$ is the fixed cost, while $\phi_A(E)/E$; (E>0) is the unit cost and d $\phi_A(E)/dE$ (when it exists) is the incremental cost.

B's task is that of processing product P and marketing the products manufactured from it. Processing of some amount E of product P is accomplished at a certain cost to B, from which there is subtracted the revenues obtained from the sale of the final products. Given an amount E of product P, B may have many alternatives in the method of processing and in selecting which final products actually to manufacture. For each non-negative value of E, $\phi_B(E)$ is the minimum cost over all possible operating schedules. Cost $\phi_B(E)$ is assumed to be a continuous monotone non-increasing function defined on the non-negative numbers. The number $\phi_B(0)$ is the fixed cost, while $-\phi_B(E)/E$; (E>0) is the unit profit, and $-d\phi_B(E)/dE$ is the incremental profit.

Ordinarily $\phi_A(E)$ is positive for all values of $E \geq 0$ and $\phi_B(E)$ is negative for large enough values of E. In the present invention, it is unique and significant that the functions $\phi_A(E)$ and $\phi_B(E)$ are convex functions of E, $E \geq 0$, and are everywhere differentiable.

With strictly convex functions, the derivatives are monotone increasing functions of E. This, therefore, is the case of increasing marginal costs and of decreasing marginal profits. In addition, operation in accordance with this invention assumes that:

$$\phi_{AB}(E) = \phi_A(E) + \phi_B(E) \tag{1}$$

where:
$\phi_{AB}(E)$ is the total system cost of operation, with the result that
$-\phi_{AB}(E)$ is the total profit.

For some non-negative value of E, the function $\phi_{AB}(E)$ has a minimum over all non-negative E.

Stating the foregoing another way, two plants, A and B, are considered. A is a producer or vendor of product P, while B is a user or purchaser of product P. The cost of producing an amount E of product P is given by the function $\phi_A(E)$, assumed continuous, differentiable, monotone non-decreasing, and strictly convex, for all $E \geq 0$, while cost of further processing product P minus the revenues obtained by the sale of the finished product is given by the function $\phi_B(E)$, assumed continuous, differentiable, monotone non-decreasing, and strictly convex for all $E \geq 0$. Finally, for some E the total cost function $\phi_{AB}(E)$ has a minimum value over all non-negative E.

In accordance with the invention, optimal operation is maintained in dependence upon the over-all operation—i.e. the value of E for which the over-all profit is a maximum. This value of E is unique and is denoted by $E^0$. Further, there exists a number $\pi^0$—the transfer price—with the following properties: If the product P is priced at that value and if A maximizes profit locally using $\pi^0$ to calculate revenue for P, then A will schedule the production of P in exactly the amount $E^0$. Further, if B also maximizes profit locally, using $\pi^0$ to calculate expenditures for P, then B must schedule purchases of product P in exactly the amount $E^0$. A produces the same amount that B purchases and no imbalances of product appear. Because the common value of A's production and B's purchase is the value $E^0$, the over-all profit is thereby maximized.

The total over-all profit is a function of E. This function is, by definition, the negative of the total cost function $\phi_{AB}(E)$, defined by Equation 1. The values of E for which the profit is maximum are obtained by finding the minimum of $\phi_{AB}(E)$ over all non-negative values of E. Since $\phi_{AB}(E)$ is the sum of two differentiable strictly convex functions, it itself is a differentiable strictly convex function, so that the minimum over $E \geq 0$ is given by a solution to $$E^o\phi'_{AB}(E^o) = 0; \quad \phi'_{AB}(E^o) \geq 0 \tag{2}$$

where the prime denotes differentiation.
Thus, $$E^o[\phi'_A(E^o) + \phi'_B(E^o)] = 0; \quad \phi'_A(E^o) + \phi'_B(E^o) \geq 0. \tag{3}$$

Whenever $E^o \neq 0$, i.e. whenever zero-production is not optimal, the conditions of Equation 3 give the following relationship directly:

$$\phi'_A(E^o) = -\phi'_B(E^o) \tag{4}$$

In general, however, optimal operation is characterized by conditions set forth in Equation 3.

By assumption, the conditions of Equation 3 always have a solution. It can be shown that this solution is unique; that is, in Case 1:

$$\phi'_A(0) + \phi'_B(0) \geq 0.$$

Then it is clear that $E^o = 0$ satisfies Equation 3. But since $\phi'_A(E)$ and $\phi'_B(E)$ are both increasing functions of E, then the relationship $\phi'_A(E) + \phi'_B(E)$ is positive for all $E > 0$ so that the first condition of Equatiion 3 cannot be satisfied for any positive E. Thus $E^o = 0$ is the only solution.

In the second case where:

$$\phi'_A(0) + \phi'_B(0) < 0,$$

$E^o = 0$ does not satisfy the second of the conditions of Equation 3. Rather, it can be satisfied only by a positive $E^o$. For a positive $E^o$ to satisfy the first condition, it must satisfy $$\phi'_A(E)\phi'_B(E^o) = 0 \tag{5}$$

But since both functions in this sum are strictly increasing, there is only one solution.

The characterization for the optimal production level, as given by Equation 3, therefore, yields a unique value for that optimal production level.

Where:

$$\pi^o \equiv \phi'_A(E^o) = -\phi'_B(E^o) \tag{6}$$

The value $\pi^o$ thus defined has the properties required of the transfer price, namely that both A and B, in order to optimize locally, must schedule production at a level given by $E^o$.

When A uses the price $\pi^o$ to calculate revenue, the objective function or A's local cost function becomes:

$$\bar{\phi}_A(E) = \phi_A(E) - \pi^o E; \tag{7a}$$

while B's objective function is given by:

$$\bar{\phi}_B(E) = \phi_B(E) + \pi^o E \tag{7b}$$

The optimal operating points for A and B are given respectively by the solutions $E_A$ and $E_B$ to $$E_A[\pi^o - \phi'_A(E_A)] = 0; \quad \phi'_A(E_A) - \pi^o \geq 0 \tag{8a}$$

$$E_B[\pi^o + \phi'_B(E_B)] = 0; \quad \phi'_B(E_B) + \pi^o \geq 0 \tag{8b}$$

In each case, of Equations 8a and 8b, solutions exist. In fact $E^o$ is a solution, as follows from Equation 6. Further, the uniqueness argument above is directly applicable here so that $E^o$ is the only solution.

Thus, in the two-plant, single product case, the convexity of the cost functions and the existence of an optimum show that there exists a transfer price which allows local decisions which are harmonious with overall system objectives. For example, in the above case, a local decision could be made as to how much intermediate product should be produced. Further, the price is given by Equation 6.

The monotone non-decreasing property of $\phi_A(E)$ means that $\pi^o$ is non-negative. Further, if $E^o > 0$, i.e. if (non-zero) production is profitable, the non-decreasing property of $\phi_A(E)$ along with the strict convexity of $\phi_A(E)$ means that $\pi^o$ is actually positive, while the strict convexity alone means that $\pi^o$ is unique.

The foregoing considerations as applied to the two-plant case will now be extended and applied to the more general case of multiple plants and multiple products.

GENERAL CASE

In the general case, there may be x plants and m products. For each plant, each product may be classified as either (1) an input product, (2) an output product, or (3) a product not involved in either input or output. In operation in accordance with the present invention, it is assumed that the operating costs for each profit center are functions of the amounts of the input products and output products. Each such function is defined for all non-negative values of all its arguments, and the functions are each strictly convex and differentiable, decreasing in variables corresponding to input products and increasing in variables corresponding to output products. If alternate methods of production are available, the least costly method is used for the determination of the cost. Finally, the total profit function (total revenues minus total purchases minus total costs) has a finite maximum. Again, it is crucial that the cost functions are treated as strictly convex and differentiable functions which allows concentration on the important properties of the system or any model thereof.

For the purpose of the following discussion, plants will be indexed with i, while the products are indexed with j. For each i the index set I(i) is defined as the set of j's for which product j is an input for plant i. Similarly O(i) is the index set for which product j is an output for plant i, while N(i) is the index set for which product j is neither input nor output.

For convenience let:

$E_{ij}$ for $j \leftarrow I(i) = $ amount of product j used as input for plant i;

$E_{ij}$ for $j \leftarrow O(i) = $ amount of product j produced by plant i.

The cost function for plant i is denoted by $\phi_i(E_{ij})$.

Generally, certain of the products j are available (or can be sold) on the open market at a price $p_j > 0$. For such products, a variable $s_j$ represents the amount of product j purchased ($s_j$ positive) or sold ($s_j$ negative) in the open market.

Conservation of product requires that the $E_{ij}$, $s_j$ satisfy the following conditions:

$$\sum_{i/j \leftarrow I(i)} E_{ij} \leq \sum_{i/j \leftarrow O(i)} E_{ij} \tag{9a}$$

where:

j is not traded on open market; and $$\sum_{i/j \leftarrow I(i)} E_{ij} \leq \sum_{i/j \leftarrow O(i)} E_{ij} + s_j \qquad (9b)$$

where:
 j is traded on the open market.
With the following definitions:

$$n_{ij} = \begin{cases} -1 & \text{if } j \leftarrow I (i); \\ 0 & \text{if } j \leftarrow N (i); \text{ and} \\ +1 & \text{if } j \leftarrow O (i); \end{cases} \qquad (10)$$

$$g_j = \begin{cases} 1 & \text{if product } j \text{ is traded on open market;} \\ 0 & \text{otherwise} \end{cases} \qquad (11)$$

Equations 9 may be written compactly as $$\sum_i n_{ij} E_{ij} + g_j s_j \geq 0 \qquad j = 1, \ldots, m \qquad (12)$$

The total over-all system cost is given by $$\sum_i \phi_i (E_{ij}) + \sum_j g_j p_j s_j \qquad (13)$$

As in the treatment of the two-plant case, the first step is to characterize optimal over-all operation. In this case, the optimal operation is given by the numbers $$E_{ij}^o, s_j^o$$

for which Equation 13 is a minimum subject to the constraints of Equation 12 and subject also to the conditions that the $$E_{ij}^o$$

be non-negative.
With the above assumptions, an optimum $$E_{ij}^o, s_j^o$$

exists. Therefore, there is a set of Lagrange multipliers $$\pi_j^o \geq 0, \text{ such that } (E_{ij}^o, s_j^o; \pi_j^o)$$

is a saddle point for the Lagrangian function $$L(E_{ij}, s_j; \pi_j) = -\sum_i \phi_i(E_{ij}) - \sum_j g_j p_j s_j + \sum_j \pi_j (\sum_i n_{ij} E_{ij} + g_j s_j) \qquad (14)$$

That is, $(E_{ij}^o, s_j^o; \pi_j^o)$ is such that $$L(E_{ij}, s_j; \pi_j^o) \leq L(E_{ij}^o, s_j^o; \pi_j^o) \leq L(E_{ij}^o, s_j^o; \pi_j) \qquad (15)$$

for all $E_{ij} \geq 0$, all $s_j$, and all $\pi_j \geq 0$.

For the general case, it can be shown that the following five conditions are necessary conditions for an over-all optimum.

$$\begin{aligned} \pi_j^o n_{ij} - \phi_i'(E_{ij}^o) &\leq 0 & \text{for all } i, j & \quad \text{I} \\ E_{ij}^o (\pi_j^o n_{ij} - \phi_i'(E_{ij}^o)) &= 0 & \text{for all } i, j & \quad \text{II} \\ \sum_i n_{ij} E_{ij}^o + g_j s_j^o &\geq 0 & \text{for } j = 1, \ldots, m & \quad \text{III} \\ \pi_j^o (\sum_i n_{ij} E_{ij}^o + g_j s_j^o) &= 0 & \text{for all } j = 1, \ldots, m & \quad \text{IV} \\ g_j \pi_j^o &= g_j p_j & \text{for } j = 1, \ldots, m & \quad \text{V} \end{aligned} \qquad (16)$$

It can readily be shown that any $$(E_{ij}^o, s_j^o, \pi_j^o)$$

which satisfies the Equation 16 is a saddle point for the Lagrangian function of Equation 14. Relations I, II, and V are used to establish the first inequality, and relations III, IV, and V are used to establish the second. Thus, the conditions specified by Equation 16 are sufficient as well as necessary, i.e.—they characterize optimal operation.

As to uniqueness, it is to be assumed that for each product there is at least one plant for which any optimal operation requires that product either to be used as input or produced as output at non-zero level. Any product failing to meet this condition is not involved at all in production, so that the Lagrangian multiplier $$\pi_j^o$$

associated with it, $$\pi_j^o$$

being the transfer price of that product, is not, generally, completely determined. For example, if a product is not in any way involved in optimal operation, it can be only a matter of indifference in general if the price of it were to rise or fall by sufficiently small amounts. The assumption is for every optimal operating plan, for each j there is an i such that $$n_{ij} E_{ij}^o \neq 0 \qquad (17)$$

With the Equation 16 characterizing over-all optimal operation, there is only one solution to those relations. For independent operation of each plant, there exists transfer prices which motivate the individual plant to optimize over-all. It can be shown that in fact the Lagrange multipliers $$\pi_j^o$$

are such transfer prices.

The foregoing description has set forth in detail the two-plant case followed by a description of the general case. Equations 8a and 8b are employed by the computer to optimize the two-plant operation. In the general case, the five conditions of Equation 16 are satisfied for an over-all multi-plant operation. Various computing operations are performed in order to control the various processes in accordance with the method of the present invention. The control process may be continuous and may be entered at various points in the system with various tests being performed to determine whether the time for any particular operation is appropriate. The requirements of Equations 8a and 8b and the requirements for optimizing the conditions of Equation 16 permit the computer to be selected as to the precision, speed and memory capacity required. From the equations given, the computer may be programmed to optimize the operation at the levels representing at least one process unit in each of plants A and B, to optimize the processes of plants A and B, and to optimize the system comprising the multi-plants. The task of the computer in providing signals representing optimal values of operating parameters is of the nature well-known in the art. Any one of several methods may be followed, several such methods being described in an article entitled "A Review of Minimizing Techniques for Non-Linear Functions" by Spang, *SIAM Review*, Volume 4, No. 4, 1962, page 343 et seq. The gradient method, of the type generically disclosed by Spang, but as modified in accordance with a random search, as disclosed in an article by Wheeling, entitled "Optimizers: Their Structure", *Communications of the Association for Computing Machinery*, Volume 3, 1960, pages 632–638, will be preferred in programming the computer to optimize the selected functions. Thus, in accordance with the invention, optimized control points are established for at least one process unit in a first plant. Material and energy cost data, product price data, and variable process data are then substantially continuously fed to optimize control of the process unit to maintain it at optimum conditions dependent upon the data. The cost and price data fed to the control and to the first plant are periodically modified to set the operating point for the process unit in the first plant in dependence upon optimum operation of the plant. Cost and price data, fed to a system which includes the plant, are then periodically modified to set an operating point for the plant dependent upon optimum operation of the system. In accordance with one mode of operation, control loops are closed on the plant and on the system at intervals, with the system loop being closed at less frequent intervals than the plant loop and with process units in at least one plant in the system continuously optimized.

Having described the invention in connection with certain specific embodiments thereof, it is to be understood that further modifications may now suggest themselves to those skilled in the art and it is intended to cover such modifications as fall within the scope of the appended claims.

What is claimed is:

1. The method of operating a system of multi-plants which produce finished products from material derived from a plurality of sources at fluctuating costs for delivery to markets of variable prices, each of said plants having a different, unique, cost function in producing the products, said method comprising operating computing apparatus to automatically perform the steps of:
   (a) establishing optimized control points for process units in a first plant,
   (b) substantially continuously feeding material and energy cost data, product price data, and variable process data to the optimized controls for said process units to maintain them at operating conditions dependent upon said data,
   (c) periodically modifying cost and process data fed to the control for said first plant to set operating points for said process units in said first plant dependent upon optimum operation of said first plant, and
   (d) periodically modifying cost and price data fed to the control for said system to set an operating point for said plant dependent upon optimum operation of said system.

2. In the control of a system of multi-unit plants which produce finished products from materials derived from a plurality of sources of supply wherein costs and market prices are subject to time variations and process variables are controllable, each of said plants operating at a different cost function, the method which comprises operating computing apparatus to automatically perform the steps of:
   (a) closing an optimizing control loop on a process unit in a first plant,
   (b) substantially continuously feeding material input functions, product output functions, and variable process functions to said control loop for maintaining said process unit at an optimum operating condition dependent upon said functions,
   (c) periodically closing a control loop on said first plant to modify input and output functions fed to said control loop for said first plant periodically to establish an optimum plant operating point to set an operating point for said unit dependent upon optimum operation of said first plant, and
   (d) periodically, but at less frequent intervals, closing an optimizing control loop on said system to modify cost and price functions fed to the control loop for said system to establish an optimum operating point and to reset operating points for said first plant for said process unit dependent upon optimum operation of said system.

3. In the control of a processing system including a plurality of plants which cooperate to produce finished products from materials derived from a plurality of sources of supply wherein costs and market prices are subject to time variations and process variables are controllable, each of said plants operating at a different cost function, the method which comprises:
   supplying from at least one of said plants to another of said plants an intermediate product,
   generating input signals indicating the input and operating parameters of each of said plants,
   applying said input signals to plant-computer-controllers, one plant-computer-controller for each of said plants,
   operating said plant-computer-controllers in response to said input signals to automatically produce an operating point signal for each of said plants,
   operating each of said plants in response to the operating point signal from the respective plant-computer-controller,
   operating a system computer-controller in response to inputs representing the cost and price of materials and finished products to automatically produce system control signals which optimize operation of said system, and
   periodically applying said system control signals to said plant-computer-controllers to modify said operating point signals to produce optimized operation of said system as a whole.

4. A system of chemical processing plants comprising:
   a plurality of multiunit plants producing finished products from materials derived from a plurality of sources of supply with variable costs and prices and controllable process variables,
   a plurality of plant controllers, one for each of said plants, input signals indicating the input and operating parameters being applied to each of said plant controllers to periodically produce an operating point signal for each of said plants, and a system controller responsive to inputs representing the cost of materials, the price of finished products and the operation of said plants to periodically, but at less frequent intervals, produce system control signals which optimize operation of said system, said system control signals being applied to said plant controllers to modify said operating point signals to produce optimized operation of said system as a whole.

5. The system recited in claim 4 wherein each of said plants is a petroleum refinery including reactor, heat exchange, catalyst separator and fractionating tower units.

6. The system recited in claim 4 wherein said plants include process units having variable process variables, said system further comprising:

a plurality of process controllers, one for each process unit, said process controllers continuously controlling the process variables of said units to optimize their operation.

7. The system recited in claim 4 further comprising:

a plant control loop for each of said plants, said plant controller for the associated plant being connected in said loop, said loop being periodically closed to modify the operating point signal for said plant, and a system control loop including said system controller and said plant controllers, said system control loop being closed periodically, but at less frequent intervals, to modify cost and price functions fed to said system control loop.

8. The system recited in claim 4 further comprising:

sensors for sensing the supply of said materials from said sources of supply and producing signals representative thereof which are applied to said system controller, and sensors for sensing the production of said finished products and producing signals representative thereof which are applied to said system controller for production of said system control signals in response thereto.

9. The system recited in claim 4 wherein an intermediate product is transferred from at least one of said plants to another of said plants, and sensors for sensing the transfer of said intermediate product and producing signals representative thereof which are applied to said system controller for production of said system control signals in response thereto.

10. In the control of a chemical processing system including a plurality of plants having multiple process units with controllable process variables, the method which comprises:

controlling the process variables of said process units to optimize them, periodically modifying control functions in control loops in said plants to periodically optimize the plant operating point dependent upon optimum operation of each plant, and periodically, but at less frequent intervals, resetting the operating points of each plant in accordance with optimum operation of said system.

11. The method recited in claim 10 wherein the step of controlling the process variables of said process units is carried out continually.

12. The method recited in claim 10 wherein said control functions in control loops in said plants are periodically modified when input/output signals deviate from preset limits.

* * * * *